(12) United States Patent
Noh et al.

(10) Patent No.: US 6,254,648 B1
(45) Date of Patent: Jul. 3, 2001

(54) METHOD OF MANUFACTURING A CASE FOR A SECONDARY BATTERY

(75) Inventors: Hyung-gon Noh, Seoul; Jong-hoon Yun, Pusan, both of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 9 days.

(21) Appl. No.: 09/637,013

(22) Filed: Aug. 14, 2000

Related U.S. Application Data

(62) Division of application No. 09/328,795, filed on Jun. 9, 1999.

(30) Foreign Application Priority Data

Jul. 29, 1998 (KR) .................................................. 98-30677

(51) Int. Cl.$^7$ .............................. H01M 2/02; B23P 17/00
(52) U.S. Cl. ........................................... 29/623.1; 29/412
(58) Field of Search .................................... 29/623.1, 412, 29/417

(56) References Cited

U.S. PATENT DOCUMENTS 5,832,585 * 11/1998 Takiar et al. .
5,906,661 * 5/1999 Lake .

* cited by examiner

*Primary Examiner*—John S. Maples
(74) *Attorney, Agent, or Firm*—Leydig, Voit & Mayer, Ltd.

(57) ABSTRACT

A method for manufacturing a case for a secondary battery includes preparing a case material in a plate state; setting a plurality of sections on the case material, each section including parts for forming a pan for a battery main body, a gas receiving portion disposed at a side of the pan, a path connecting the pan and the gas receiving portion, and a cover portion covering the pan and the gas receiving portion together; forming the pan of the battery main body, the gas receiving portion, and the path by molding the case material; and severing each section from the case material.

2 Claims, 6 Drawing Sheets

METHOD OF MANUFACTURING A CASE FOR A SECONDARY BATTERY

This is a division of copending application Ser. No. 09,328,295, filed on Jun. 9, 1999.

BACKGROUND OF THE INVENTION

1. Field of the Invention

The present invention relates to a case for a secondary battery and a manufacturing method thereof, and more particularly, to a case for a secondary battery which seals a main body of a current-generating battery, and to a manufacturing method thereof.

2. Description of the Related Art

Secondary batteries usually include a battery main body for generating current formed by stacking an anode plate, a cathode plate and a separator. An electrode terminal is connected to the battery main body which functions as an electrical passage to the outside. The battery main body and a portion of the electrode terminal are coupled, forming a seal.

According to the conventional technology, the lithium secondary battery is manufactured after the battery main body is inserted in a case in a form of a pouch. However, due to the structure as above, mass production of the battery is not easy and furthermore a bonding surface which closes a receiving portion of the case where the battery is received is not stable.

SUMMARY OF THE INVENTION

To solve the above problems, it is an objective of the present invention to provide a case for a secondary battery which can be manufactured through mass production and has an improved bonding surface.

It is another objective of the present invention to provide a method for manufacturing the case for a secondary battery Accordingly, to achieve the first objective, there is provided a case for a secondary battery which comprises: a pan having a space for accommodating a battery main body and an opening at the upper side thereof; a first bonding portion extended along the edge of the pan; a cover portion extended from the upper portion of one side of the pan for closing the opening of the pan by being folded onto the pan; and a second bonding portion extended along the edge of the cover portion and correspondingly attached to the first bonding portion when folded onto the pan.

It is preferable in the present invention that the pan, the first bonding portion, the cover portion, and the second bonding portion are integrally formed.

It is also preferable in the present invention that the first bonding portion and the second bonding portion are attached to each other without deformation.

It is yet preferable in the present invention that an emboss is formed at corresponding portions of the first bonding portion and the second bonding portion and the embossed portions of the first bonding portion and the second bonding portion are attached to each other.

It is further preferable in the present invention that concave and convex portions are formed at corresponding portions of the first bonding portion and the second bonding portion along the edge thereof and the concave and convex portions of the first bonding portion and the second bonding portion are attached to each other.

According to another aspect of the present invention, there is provided a case for a secondary battery which comprises: a pan having a space for accommodating a battery main body and an opening at the upper side thereof; a first bonding portion extended along the edge of the pan; a cover portion formed separately from the pan for closing the opening of the pan; and a second bonding portion extended along the edge of the cover portion and correspondingly attached to the first bonding portion.

To achieve the second objective, there is provided a method for manufacturing a case for a secondary battery which comprises the steps of: sectioning a plate material for the case to form a pan and a cover portion on the plate material; molding the material to form the pan; and severing the material according to each section of the plate material preparing a case material in a plate state: setting a plurality of sections on the case material for forming a pan of a battery main body, a gas receiving portion disposed at a side surface of the pan of the battery main body, a path connecting between the pan of the battery main body and the gas receiving portion, and a cover portion covering the pan of the battery main body and the gas receiving portion together; forming the pan of the battery main body, the gas receiving portion, and the path by molding the case material; and severing the case material according to each section.

It is preferable in the present invention that the molding of the material is performed by a pressing process.

BRIEF DESCRIPTION OF THE DRAWINGS

The above objectives and advantages of the present invention will become more apparent by describing in detail a preferred embodiment thereof with reference to the attached drawings in which.

Figure 1:
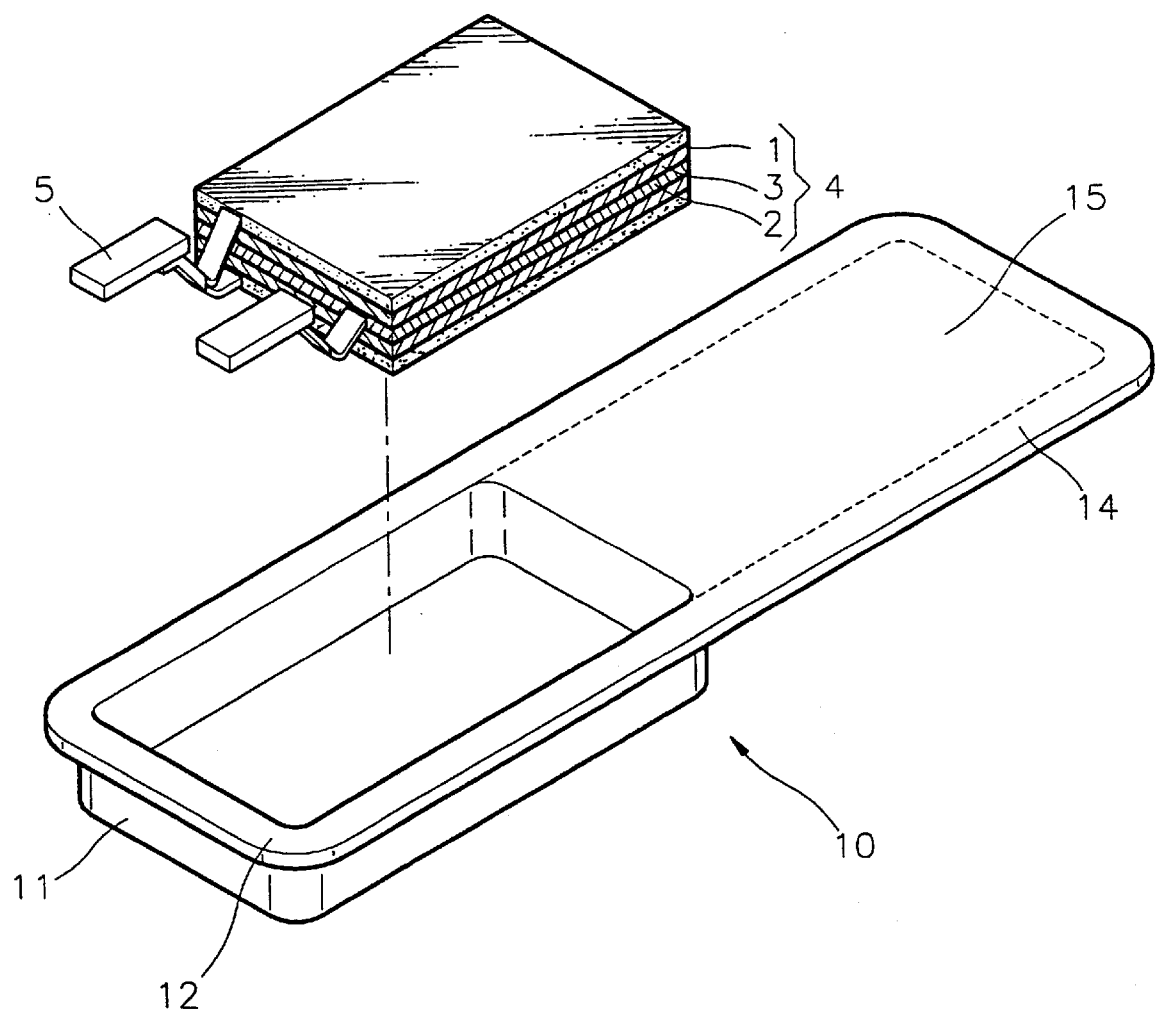
FIG. 1 is an exploded perspective view illustrating a secondary battery having a case according to a preferred embodiment of the present invention.
Figure 2:
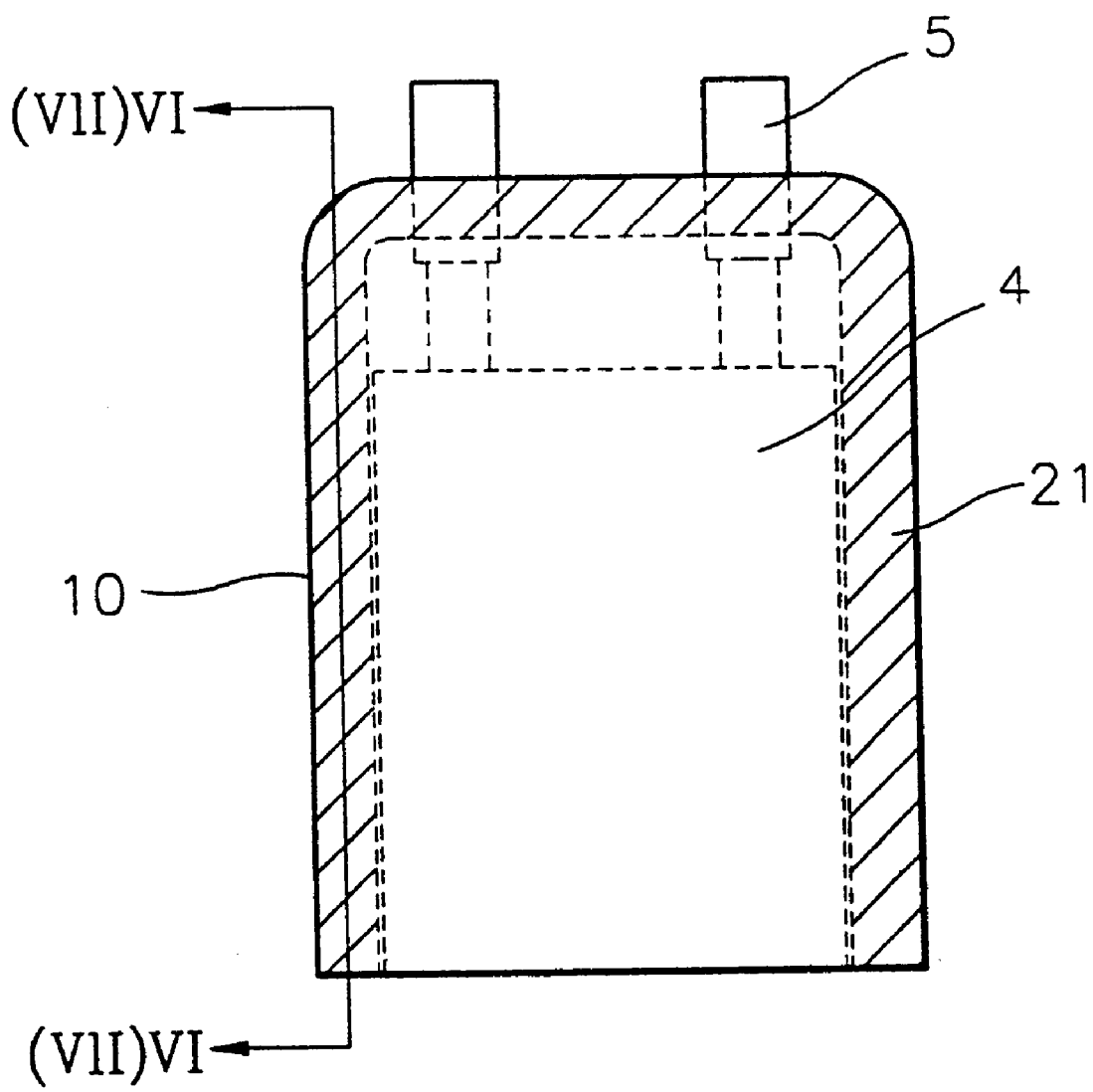
FIG. 2 is a plan view of the secondary battery of FIG. 1 in an assembled is state.
Figure 3:
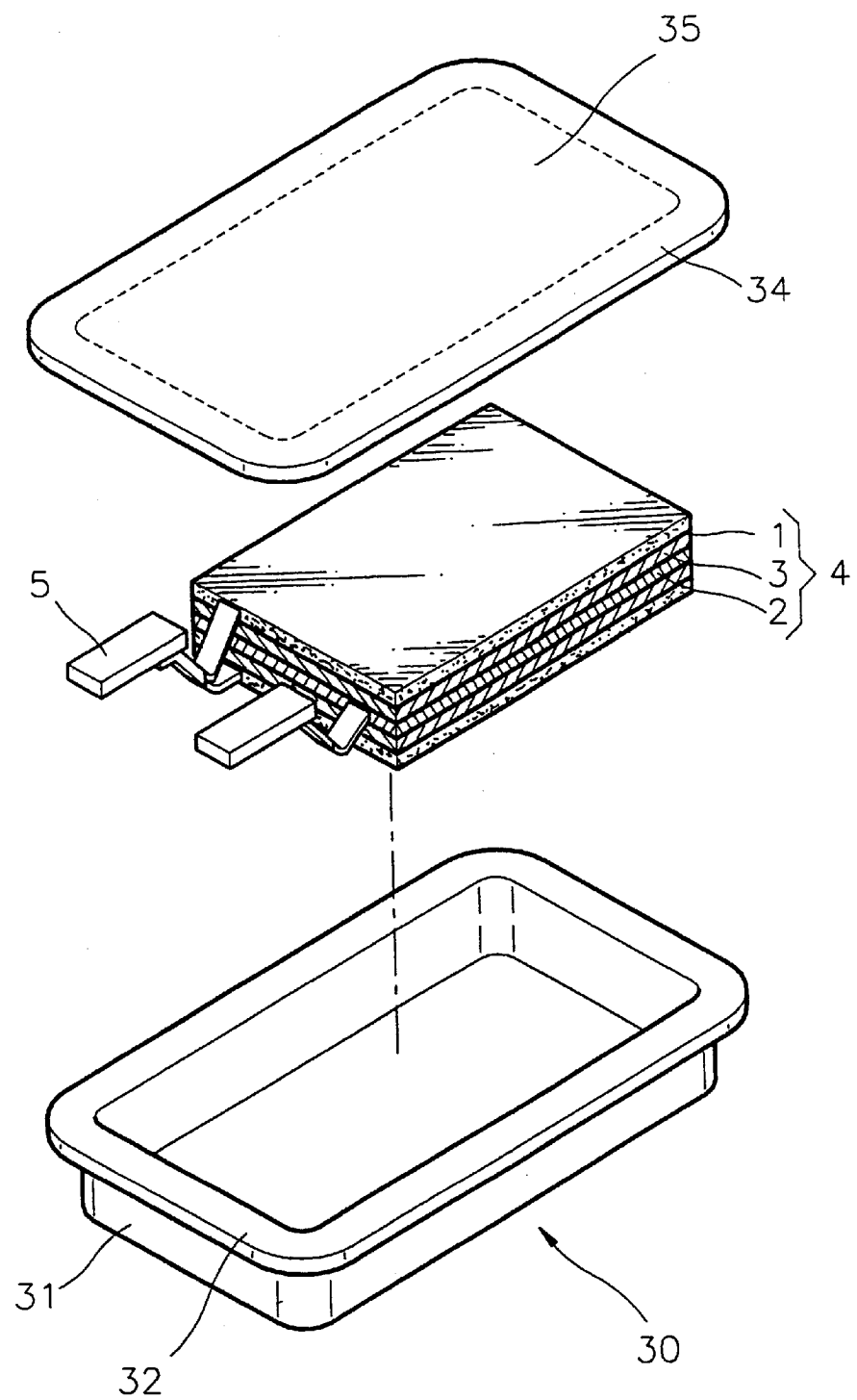
FIG. 3 is an exploded perspective view illustrating a secondary battery having a case according to another preferred embodiment of the present invention.
Figure 4:
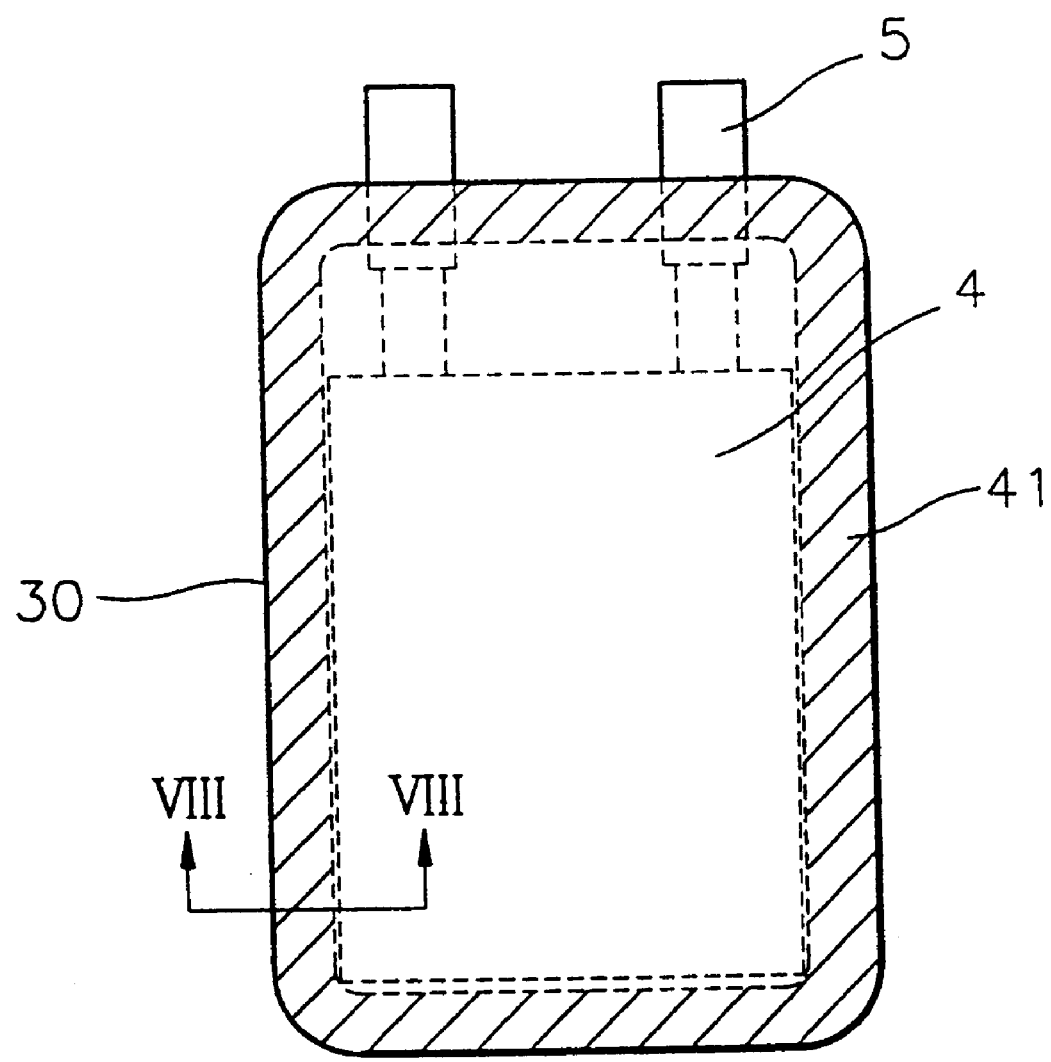
Figure 5:
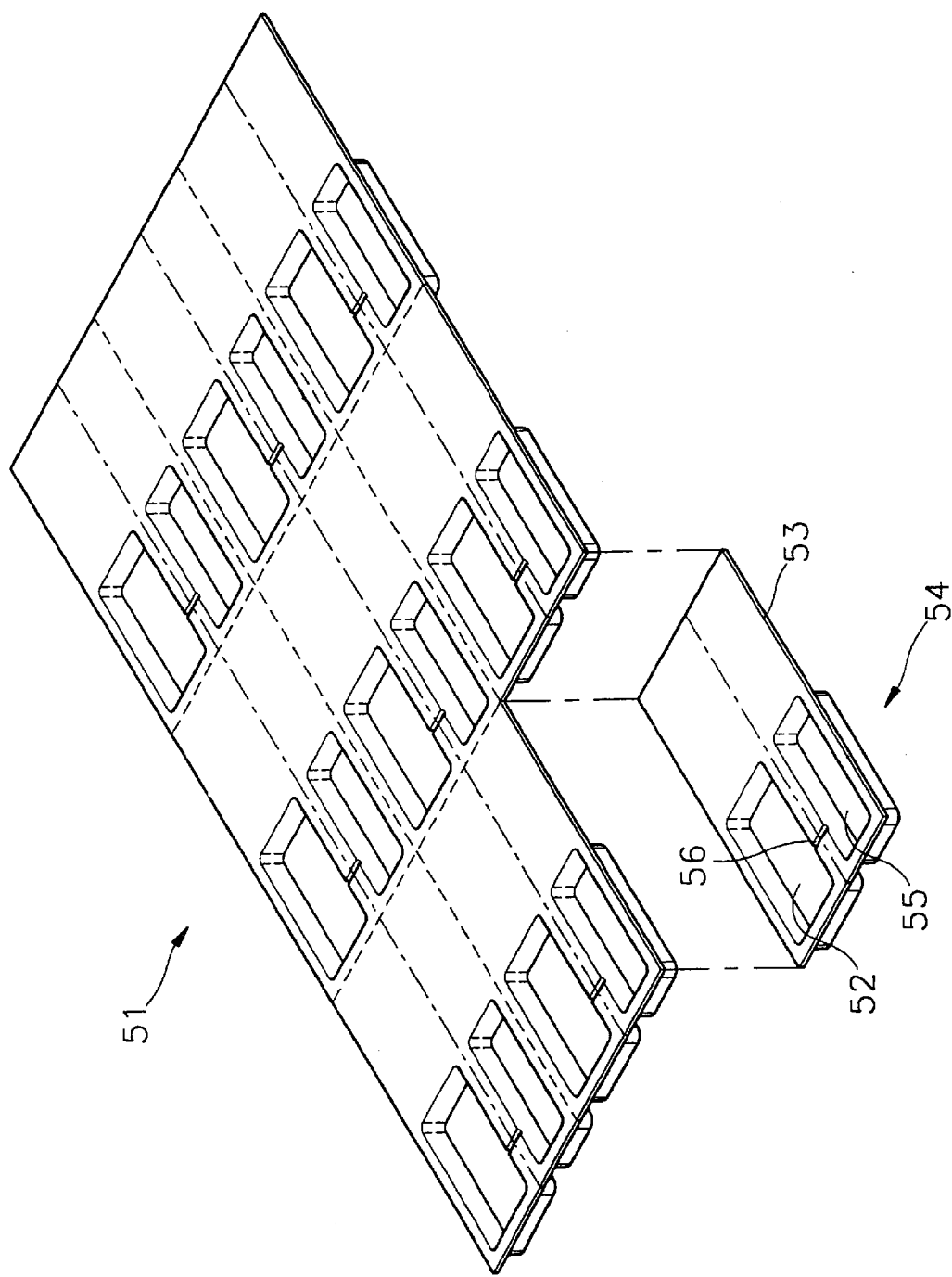
Figure 6:
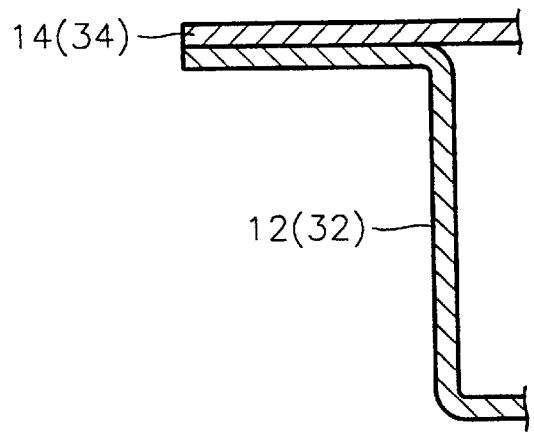
Figure 7:
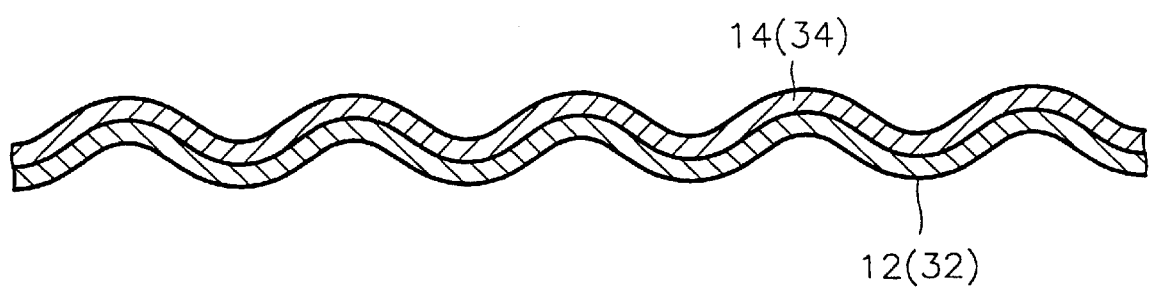
Figure 8:
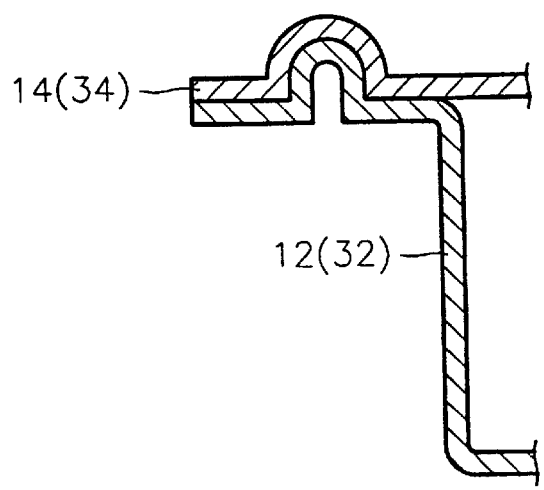

FIG, 4 is a plan view of the secondary battery of FIG. 3 in an assembled state;

FIG. 5 is a perspective view for explaining a method for manufacturing the case of the secondary battery shown in FIG. 1; and FIGS. 6, 7, and 8 are sectional views taken along the lines VI—VI and VII—VII of FIG. 2 and the line VIII—VIII of FIG. 4, respectively.

DETAILED DESCRIPTION OF THE INVENTION

FIG. 1 shows a case of a secondary battery according to a preferred embodiment of the present invention. Referring to the drawing, the secondary battery includes a battery main body 4 for generating current, in which an anode plate 1, a cathode plate 2 and a separator 3 are stacked, and a case 10 for housing the battery main body 4. The battery main body 4 can have a different structure according to the type of lithium secondary battery, for example, a lithium ion battery, a lithium polymer battery, and a plastic lithium ion battery. One end of an electrode terminal 5 functioning as an electrical passage to the outside is connected to each electrode plate of the battery main body 4 when the battery main body 4 is coupled to the case 10 forming a seal. The other end of the electrode terminal 5 is exposed to the outside.

According to the present invention, the case 10 includes a pan 11 where the battery main body 4 is received, a first bonding portion 12 which is a flange along the edge of the pan 11, a cover portion 15 which is to be folded onto the pan 11 to close the opening of the pan 11, and a second bonding portion 14 which is extends along the edge of the cover portion 15 and attached to the first bonding portion 12 when the cover portion is folded onto the pan 11. The pan 11 is a cubic space for accommodating the battery main body 4 and has an opening only at the upper surface thereof. The cover portion 15 is an extended flange on one side of the pan 11 and can close the pan 11 when folded.

The pan 11, the first bonding portion 12, the cover portion 15, and the second bonding portion 14 are integrally formed. The battery main body 4 is inserted in the pan 11 through the opening. As shown in the drawing, the first bonding portion 12 and the second bonding portion 14 form one rectangular flange when the cover portion 15 is not folded onto and does not close the pan 11. The cover portion 15 closes the upper opening of the pan 11 after the battery main body 5 is inserted in the pan 11. The first bonding portion 12 and the second bonding portion 14 can be bent to 90° after being bonded together.

FIG. 2 is a plan view showing the secondary battery of FIG. 1 in a assembled state. Referring to the drawing, after the battery main body 4 is inserted into the pan 11, the electrode terminals 5 connected to each electrode plate (not shown) of the battery main body 4 are exposed outside the case 10 to a predetermined length and the cover portion 15 closes the pan 11. The hatched area 21 in the drawing shows the area where the first and second bonding portions 12 and 14 are coupled to each other. Here, since no additional bonding portion is needed for the portion where the cover portion 15 extends from the pan 11, the ratio of occupancy of the battery main body 4 to the total volume of the case 10 increases. Thus, battery efficiency per unit volume is improved in the secondary battery.

FIG. 3 shows a case for a secondary battery according to another preferred embodiment of the present invention. Referring to the drawing, the secondary battery, as in the secondary battery shown in FIG. 1, includes a battery main body 4 for generating current, in which an anode plate 1, a cathode plate 2 and a separator 3 are stacked, and a case 30 for sealing the battery main body 4. Here, the case 30 includes a pan 31 and a cover portion 35 separately manufactured to cover the opening of the pan 31. The pan 31 is rectangular. The pan 31 has a flange as a first bonding portion 32. The cover portion 35 is a plate capable of closing the opening of the pan 31 after the battery main body 4 is inserted into the pan 31. A second bonding portion 34 is a marginal area of the cover portion 35 and the second bonding portion 34 is attached to the first bonding portion 32. The pan 31 and the cover portion 35 can be manufactured by a molding process such as metal molding of plate material for the case.

FIG. 4 is a plan view showing the secondary battery of FIG. 3 in an assembled state. Referring to the drawing, the battery main body 4 is inserted into the pan 31 and the cover portion 35 covers the pan 31 in a state in which the electrode terminals 5 connected to the respective electrode plates (not shown) of the battery main body 4 are exposed outside the case 30 to a predetermined length. The hatched area 41 of the drawing indicates a portion where the first bonding portion 32 and the second bonding portion 34 are attached to each other. Here, to increase the bonding strength between the first bonding portion 32 and the second bonding portion 34, the pan 31 and the cover portion 35 can be manufactured using different materials and in different thicknesses.

The case for the secondary battery having the above structure may be manufactured as follows.

A metal plate is molded to form the pan 11 (31) and the first bonding portion 12 (32), and the second bonding portion 14 (34) at the cover portion 15 (35). Here, the cover portion 15 (35) and the second bonding portion 14 (34) are formed integrally with the pan 11 (31) and the first bonding portion 12 (32) or separately therefrom. The battery main body 4 is inserted into the pan 11 (31) and the electrode terminals 5 connected to the battery main body 4 are arranged to be exposed outward. The first bonding portion 12 (32), which is a flange of the pan 11 (31), and the second bonding portion 14 (34), which is a marginal area of the cover portion 15 (35), are attached to each other, forming a closed space inside the case 10 (30). The above manufacturing method is schematically described. In an actual case, a step for storing gas generated when the battery main body 4 is charged or discharged in the gas receiving portion, which will be described with reference to FIG. 5.

FIG. 5 is a view for explaining a method for forming the secondary battery case shown in FIG. 1 in large quantities using a plate material.

Referring to the drawing, a plate material 51 is sectioned as indicated by the dotted lines and a unit case 54 can be formed per section. Each unit case 54 has a 1s pan 52 and a gas receiving portion 55 of the battery main body. The gas generated in the battery pan 52 can be exhausted to the gas receiving portion 55 through a path 56. When a battery is manufactured including a battery main body in a battery case, the battery main body is contained in the battery pan 52. Next, a cover portion 53 covers over both the battery pan 52 and the gas receiving portion 55, forming a seal. At this time, the path 56 is kept in an open state. When the battery main body charges and discharges, the gas generated from the battery main body flows toward the gas receiving portion 55 through the path 56 from the battery pan 52. When the gas is gathered in the gas receiving portion 55, the path 56 is closed. Finally, the gas receiving portion 55 is removed in a severing process.

The unit case 54, as shown in FIG. 5, can be formed by severing the material along the line indicated by a dot-dash-dot line after the battery main body pan 55, the gas receiving portion 55, and the path 56 are formed per section through a predetermined process such as in a press.

In another embodiment, a separately manufactured battery main body is inserted in the pan 52 before the material 51 is severed along a dashed line extending in a lengthwise direction of the material 51 and along a dashed line extending in a widthwise direction thereof. Next, the cover portion 53 is folded concurrently so that the cover portion 53 is closely coupled to the pan 52. Next, the battery main body is charged/discharged and the path 56 is closed. Finally, the material 51 is severed in a lengthwise direction so that the gas receiving portion 52 is removed and simultaneously each unit case can be separated.

In yet another example, separately from the severance of the portions indicated by the dotted lines, the portion where the pan 52 is formed and the portion where the cover portion 53 is formed are severed and separated from each other and thus the battery case shown in FIG. 3 can be manufactured.

FIGS. 6 and 7 are sectional views taken along the lines VI—VI and VII—VII of FIG. 2 and FIG. 8 is a sectional view taken along the line VIII—VIII of FIG. 4. These drawings show methods of attaching the first bonding portion 12 (32) to the second bonding portion 14 (34).

FIG. 6 shows a surface bonding method, in which the first bonding portion 12 (32) and the second bonding portion 14 (34) are attached to each other without deformation.

Although various attaching methods can be used, arc welding is preferred.

FIG. 7 shows an embossing method, in which an embossed portion is formed at the corresponding portions of the first bonding portion 12 (32) and the second bonding portion 14 (34) to increase the bonding strength.

FIG. 8 shows a linear method, in which concave and convex portions are formed at the corresponding portions of the first bonding portion 12 (32) and the second bonding portion 14 (34). This method also increases the bonding strength.

As described above, in secondary batteries according to the present invention, the case having a pan for accommodating a battery main body, a cover portion for closing the pan, and a bonding portion extended along the edge of the pan and the cover portion can be easily manufactured. Also, since the bonding portions can be attached by one of a surface method, an embossing method, and a linear method, mass production of the case is possible and the bonding portions are connected together firmly.

What is claimed is:

1. A method for manufacturing a case for a secondary battery, said method comprising:

preparing a case material in a plate state:
  setting a plurality of sections on said case material, each section including parts for forming a pan for a battery main body, a gas receiving portion disposed at a side of said pan, a path connecting said pan and said gas receiving portion, and a cover portion covering said pan and said gas receiving portion together;
  forming said pan of said battery main body, said gas receiving portion, and said path by molding said case material; and
  severing each section from said case material.

2. The method as claimed in claim 1, including molding said material by pressing.

* * * * *